(12) United States Patent  
Estes et al.

(10) Patent No.: US 10,443,297 B1  
(45) Date of Patent: Oct. 15, 2019

(54) HAND TOOL

(71) Applicants: Charles Jeffery Estes, Theodore, AL (US); Guin Joseph Thornton, Grand Bay, AL (US)

(72) Inventors: Charles Jeffery Estes, Theodore, AL (US); Guin Joseph Thornton, Grand Bay, AL (US)

(73) Assignee: George L Williamson, Fairhope, AL (US)

( * ) Notice: Subject to any disclaimer, the term of this patent is extended or adjusted under 35 U.S.C. 154(b) by 0 days.

(21) Appl. No.: 15/992,324

(22) Filed: May 30, 2018

Related U.S. Application Data

(60) Provisional application No. 62/708,720, filed on Dec. 19, 2017.

(51) Int. Cl.  
*E06B 1/52* (2006.01)  
*H02K 7/14* (2006.01)  
*E06B 1/62* (2006.01)

(52) U.S. Cl.  
CPC ............... *E06B 1/524* (2013.01); *E06B 1/62* (2013.01); *H02K 7/145* (2013.01)

(58) Field of Classification Search  
CPC . E06B 1/524; E06B 1/62; H02K 7/145; E04F 21/0038; B25B 27/0092  
See application file for complete search history.

(56) References Cited

U.S. PATENT DOCUMENTS

| 739,343 | A | * | 9/1903 | Peregrine | B21F 33/02 140/109 |
|---|---|---|---|---|---|
| 3,077,907 | A | * | 2/1963 | Gottlieb | E06B 9/52 140/109 |
| 3,828,832 | A | * | 8/1974 | Hartman | B21F 33/02 140/109 |
| 4,005,737 | A | * | 2/1977 | Nason | B21F 33/02 140/109 |
| 4,241,487 | A | * | 12/1980 | Kraver | B25B 27/0092 140/109 |
| 4,899,429 | A | | 2/1990 | Londono | |
| 4,910,821 | A | | 3/1990 | Kieferle | |
| 5,052,093 | A | * | 10/1991 | Urlacher | B25B 27/0092 29/235 |
| 5,127,143 | A | * | 7/1992 | Urlacher | B25B 27/0092 29/235 |
| 6,131,260 | A | | 10/2000 | Catt | |
| 6,264,211 | B1 | | 7/2001 | Granado | |
| 6,832,428 | B2 | | 12/2004 | Miura et al. | |
| 8,510,923 | B2 | * | 8/2013 | Ward | B25B 27/0092 140/109 |

(Continued)

Primary Examiner — Rodney Mintz  
(74) Attorney, Agent, or Firm — George L Williamson

(57) ABSTRACT

Method and apparatus for an electrically powered hand tool which can be used to install a spline into the groove on a frame member of a screened-in porch or window screen wherein the tool uses a reciprocating roller to press the screen and spline into the groove of the frame member so that the screen can be secured to the frame member. The hand tool has a handle serving as a housing for an electric motor with a rotating output shaft connecting to a transmission for creating reciprocating motion of a drive shaft having a distal end supporting a rotatable wheel adapted to compress the spline in the groove containing a portion of the screen while the handle is moved along the spline in the groove by a user.

10 Claims, 3 Drawing Sheets

(56) References Cited

U.S. PATENT DOCUMENTS

2005/0257380 A1* 11/2005 Karl .................. B23P 19/047
30/319
2010/0122443 A1* 5/2010 Ward ................ B25B 27/0092
29/235

* cited by examiner

HAND TOOL

RELATED APPLICATIONS

This application claims benefit to the U.S. Provisional Patent Application Ser. No. 62/708,720 filed Dec. 19, 2017.

BACKGROUND OF THE INVENTION

Field of the Invention

The present invention relates generally to electric hand tools and, more particularly, is concerned with an apparatus used to install a spline into the groove of an upright standing frame member of a screened-in porch wherein the tool is used to press the screen and spline into the groove of the upright frame member so that the screen can be secured to the upright frame member of the screened-in porch.

DESCRIPTION OF THE RELATED ART

Electrically powered hand tools have been described in the related art, however, none of the related art devices disclose the unique features of the present invention.

U.S. Pat. No. 6,832,428, dated Dec. 21, 2004 to Miura, et al., discloses an invention related to press-fitting a weather strip into a flange, specifically a vehicle's door. Miura discloses an invention that uses a vibration hammer with two rods, one of a small diameter and the other of a larger diameter, to install a weather strip on a vehicle. U.S. Pat. No. 6,264,211, dated Jul. 24, 2001 to Granado, discloses a reciprocating saw attachment for an electric drill. U.S. Pat. No. 6,131,260, dated Oct. 17, 2000 to Catt, discloses a self-feeding screening installation tool. U.S. Pat. No. 4,899,429, dated Feb. 13, 1990 to Londono, discloses a screen installer tool. U.S. Pat. No. 4,910,821, dated Mar. 27, 1990 to Kieferle, discloses a screen installers tool.

While these methods for electrically powered hand tools may be suitable for the purposes for which they were designed, they would not be as suitable for the purposes of the present invention as hereinafter described. As will be shown by way of explanation and drawings, the present invention works in a novel manner and differently from the related art.

SUMMARY OF THE PRESENT INVENTION

The present invention discloses an electrically powered hand tool which can be used to install a spline into the groove on an upright standing frame member of a screened-in porch wherein the tool uses a reciprocating roller to press the screen and spline into the groove of the upright frame member so that the screen can be secured to the upright frame member of the screened-in porch. The hand tool of the present invention has a handle serving as a housing containing an electric motor with a rotating output shaft connecting to a transmission for creating reciprocating motion of a drive shaft having a forked distal end supporting a rotatable wheel adapted to compress the spline in the groove containing a portion of the screen while the handle is moved along the spline in the groove by a user.

An object of the present invention is to provide a tool to assist in installing screen on upright members for forming a screened-in porch or for replacing screen in a window screen frame. A further object of the present invention is to assist in installing the spline into a groove of an upright member for forming a screened-in porch. A further object of the present invention is to provide an electrically powered tool to assist in installing the spline into a groove of an upright member for forming a screened-in porch. A further object of the present invention is to provide an electrically powered tool having a reciprocating roller thereon to assist in installing the spline into a groove of an upright member for forming a screened-in porch.

The foregoing and other objects and advantages will appear from the description to follow. In the description reference is made to the accompanying drawings, which form a part hereof, and in which is shown by way of illustration specific embodiments in which the invention may be practiced. These embodiments will be described in sufficient detail to enable those skilled in the art to practice the invention, and it is to be understood that other embodiments may be utilized and that structural changes may be made without departing from the scope of the invention. In the accompanying drawings, like reference characters designate the same or similar parts throughout the several views.

The following detailed description is, therefore, not to be taken in a limiting sense, and the scope of the present invention is best defined by the appended claims.

BRIEF DESCRIPTION OF THE DRAWINGS

In order that the invention may be more fully understood, it will now be described, by way of example, with reference to the accompanying drawings in which.

LIST OF REFERENCE NUMERALS

Figure 1:
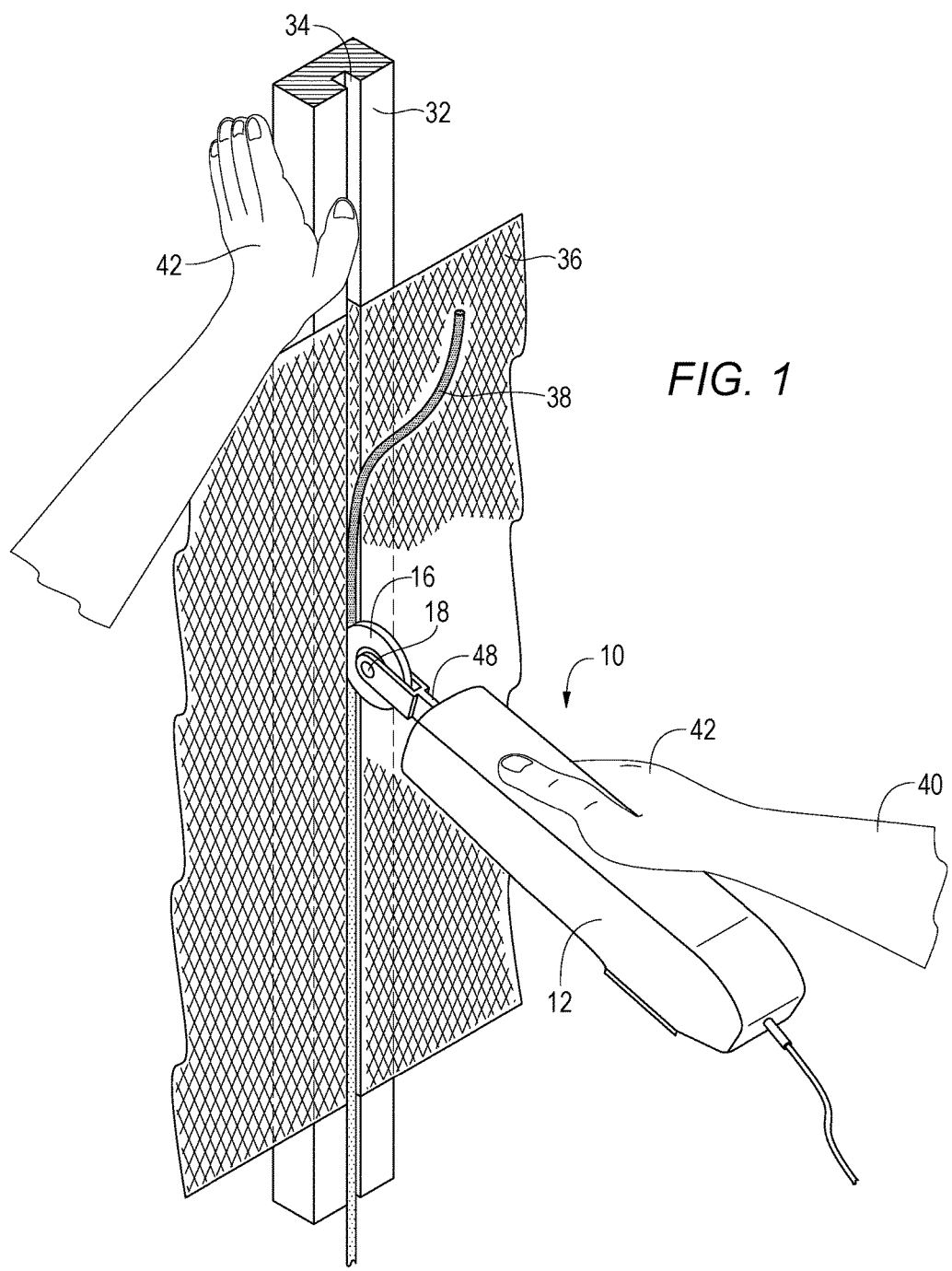
FIG. 1 is a perspective view of the present invention shown in operative connection with an upright frame member.

With regard to reference numerals used, the following numbering is used throughout the drawings.
- 10 present invention
- 12 ergonomically shaped handle for being held in the hand
- 13 forward end
- 14 on/off button
- 15 rearward end
- 16 rotatable wheel
- 18 axle
- 20 electric cord
- 22 electrical plug
- 24 related art
- 26 handle of related art
- 28 wheel of related art
- axle of related art
- 32 frame member
- 34 groove
- 36 screen material
- 38 spline
- 40 user
- 42 hands of user
- 43 drive mechanism/transmission 44 electric motor
46 frame supporting the axle
48 drive shaft
50 output motor shaft
52 first beveled gear
53 axle supporting second beveled gear
54 second beveled gear
56 gear pin
57 one end of rod
58 rod
59 second end of rod
60 drive pin
62 tube
64 frame member on inside of handle
66 groove of window screen frame
68 frame of window screen
70 spline

DETAILED DESCRIPTION OF THE PREFERRED EMBODIMENT

The following discussion describes in detail at least one embodiment of the present invention. This discussion should not be construed, however, as limiting the present invention to the particular embodiments described herein since practitioners skilled in the art will recognize numerous other embodiments as well. For a definition of the complete scope of the invention the reader is directed to the appended claims. FIGS. 1-6 illustrate the present invention wherein a method and apparatus for a hand tool useful for installing screen onto the upright frame members for constructing a screened-in porch or repairing a window screen is disclosed and which is generally indicated by reference number 10.

Figure 2:
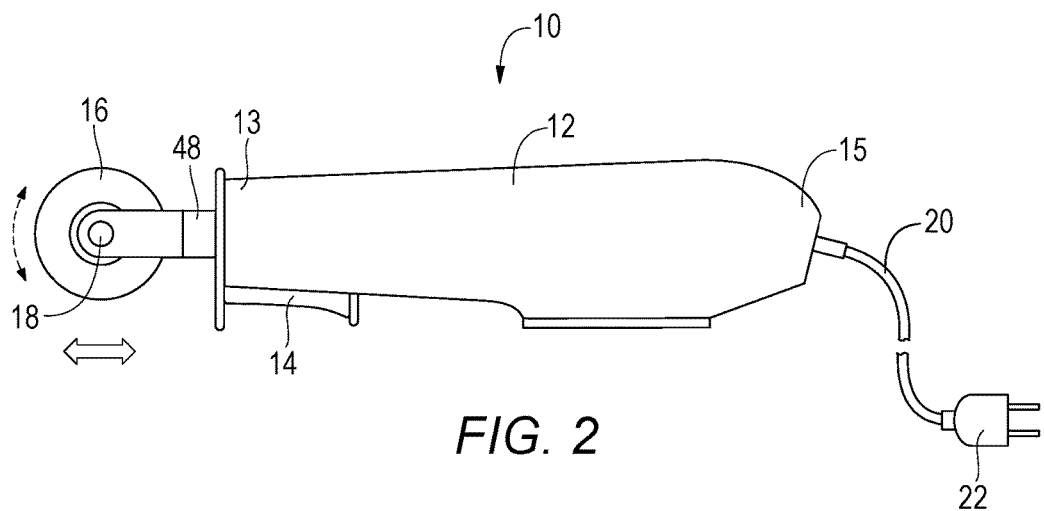
FIG. 2 is a side view of the present invention

Turning generally to FIGS. 1-2, therein are shown views useful for understanding the present invention 10. FIGS. 1 and 2 show the present invention 10 comprising an ergonomically-shaped handle 12 having a forward end 13 and a rearward end 15 for being held in the hand 42 of a user 40 having an on/off button 14 thereon for controlling the operation of the present invention and also having a free-wheeling rotatable wheel 16 thereon which rotates about an axle 18 so that the wheel is rotatable, i.e., it rolls, in a 360-degree arc/circle. Also shown is an electric cord 20 and plug 22 for providing 110-120 volt AC current from a power outlet to the electric motor housed within the handle 12 of the present invention 10 for causing the wheel 16 to reciprocate back and forth on a drive shaft 48 along a line substantially parallel to and co-aligned with the longitudinal centerline of handle 12. Handle 12 also forms a housing for containing many of the components of the present invention 10.

Figure 3:
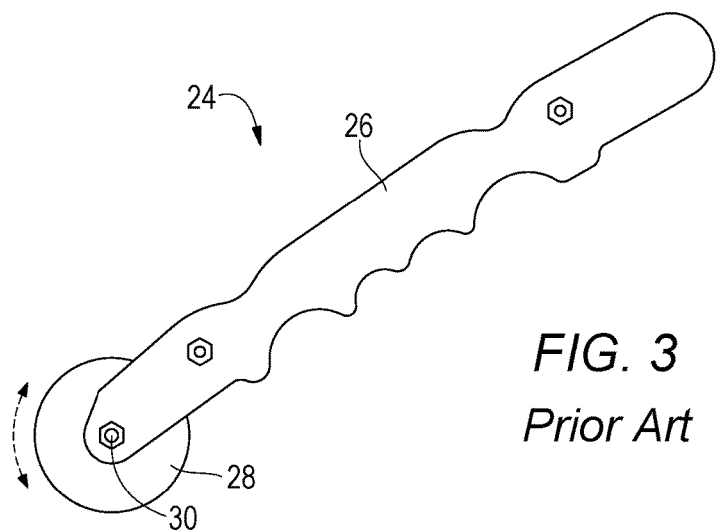
FIG. 3 is a side view of the related art.

Turning to FIG. 3, therein is shown the prior art 24 tool for installing screen having a handle 26 thereon having a wheel 28 which rotates about an axle 30 which wheel is disposed on one end of the hand tool 24 wherein the grip portion of the handle is to be held in the hand of a user so that the hand tool 24 can be pushed back and forth manually by a hand of a user along a frame member of the screened porch so as to install a spline into a groove.

Turning to FIG. 1, therein is shown a single upright frame member 32 being a typical single component, e.g., a 2"×4" wooden beam, of the entire multi-component frame work (not shown) wherein frame member 32 has a groove 34 therein wherein the screen material 36 is placed into the groove and held in place by the spline 38. In a typical installation, the frame member 32 would be upright standing in a vertical disposition and would be one member of a plurality of upright standing frame members forming a screened-in porch. One skilled in the art would understand that the entire multi-component frame work (not shown) would include several single frame members 32. Also, FIG. 1 shows the upright frame member 32 along with the groove 34 showing the screen 36 being installed in the groove with a spline 38 being then placed over the screen in the groove so as to hold the screen in the groove 34 in a very tight and secure manner. One skilled in the art would understand that spline 38 is sized and shaped to be frictionally held within the groove 34 in the conventional manner so that the screen 36 is tightly held within the groove 34.

Continuing with FIG. 1, therein is shown the present invention 10 wherein it is being used to install the screen 36 within the groove 34 of the frame member 32 using spline 38 wherein a user 40 is using his hands 42 to grip the handle 12 of the present invention 10 so as to push the present invention 10 having a reciprocating roller 16 thereon so that the roller 16 is pushed along the groove 34 while pushing the spline 38 and screen 36 downwardly and forcefully into the groove 34 so that the screen 36 is tightly and securely held within the groove 34 of the upright frame member 32. The present invention 10 is pushed along the frame member 32 along the longitudinally length of the frame member 32 and into and toward the center or interior of the frame member 32 so that the reciprocating motion of roller 16 squeezes and compresses the spline 38 into the grove 34.

Figure 4:
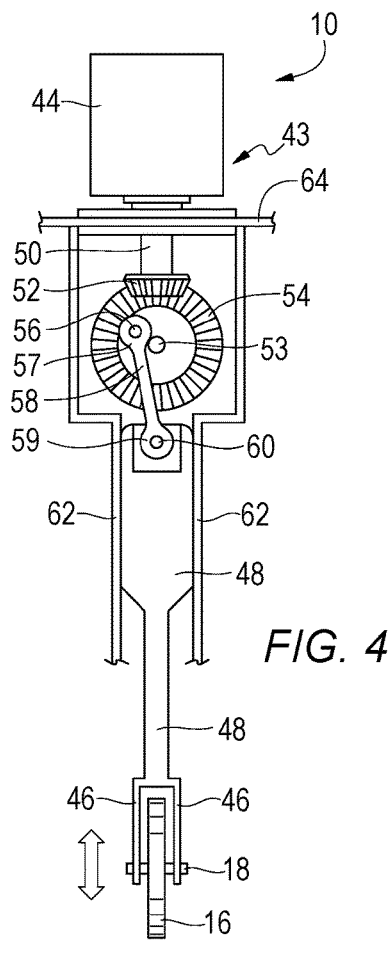
FIG. 4 is a cut away view showing portions of the present invention.
Figure 5:
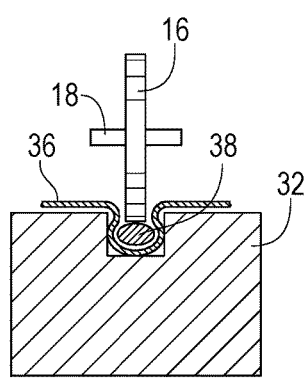
FIG. 5 is an elevation view showing portions of the present invention in operative connection with certain parts shown in cross-section for ease of illustration.

Turning to FIG. 4, therein is shown one embodiment of the transmission or drive mechanism 43 of the present invention 10 including a conventional electric motor 44 which provides the electric power to reciprocate the roller wheel 16 of the present invention wherein the roller wheel 16 is mounted on an axle 18 which axle is supported on a frame 46 which could be of many different designs wherein the frame 46 is attached onto an end of a drive shaft 48 which is driven by the electric motor 44. The distal end of drive shaft 48 extends outwardly from the forward end of handle 12. The electric motor 44 has a rotating output motor shaft 50 extending forwardly therefrom which has on an end thereof a first beveled gear 52 which cooperates with a second bevel gear 54 mounted on axle 53 to convert the rotary motion of the electric motor to reciprocating motion of the drive shaft 48 to cause the drive shaft 48 and roller wheel 16 to reciprocate back and forth along a longitudinal axis thereof in a plane substantially parallel with the handle 12 of the present invention 10 so that energy from the electric motor is transmitted through the drive shaft 48 to the spline 38 so as to cause the spline to be secured within the groove 34 of the upright frame member 32 of a screened-in porch (as shown in FIG. 5). The bevel gears 52, 54 cooperate with each other wherein bevel gear 54 has a gear pin 56 mounted thereon so that one end 57 of a rod 58 is attached to gear pin 56 and a second end 59 of rod 58 is connected to drive pin 60 which drive pin 60 is disposed on one end or proximate end of drive shaft 48 having the roller wheel 16 along with axle 18 and frame 46 mounted onto an opposing end of drive shaft 48 so that the drive shaft reciprocates in response to rotation of the electric motor 44 which is connected to a power source, e.g., a 110-120 volt AC (alternating current) power outlet using electrical cord 20 and plug 22 in the standard manner as would be done by one skilled in the art. Frame 46 may be forked as illustrated or made of a single piece design. Drive shaft 48 generates vibratory motion by reciprocating inside tube 62 or the like. Drive mechanism 43 is supported by frame member 64 which is a part of the inside of the handle 12 of the present invention 10 which houses the drive mechanism. It would be obvious to one skilled in the art that the electric motor 44 could be powered by a battery in substitution of the previously disclosed alternating current power source wherein the energy from a battery disposed in or on the housing would provide a direct current power source to cause the electric motor 44 to operate.

Turning to FIG. 5, therein is shown the frame member 32 and groove 34 along with screen 36 wherein the roller wheel 16 is being used to press the spline 38 into the groove in the direction of the central interior of member 32 so that the screen is tightly frictionally held to the interior surface of the groove. Roller 16 is sized to push the spline 38 all the way into groove 34 so that the spline is secured in the groove. The roller 16 is expected to have the approximate dimensions of ⅛" in thickness and 2" in diameter. Roller wheel 16 extends into groove 34 an effective distance so that the screen 36 is tightly frictionally held within the groove 34 (also see FIGS. 1 and 6).

Figure 6:
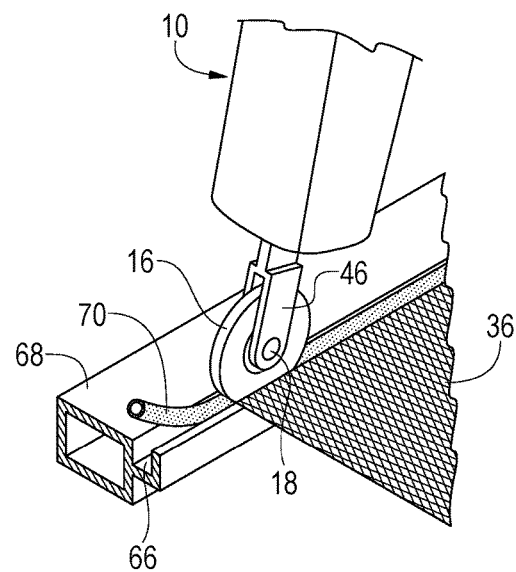
FIG. 6 is a perspective view of the present invention shown in operative connection with a window screen frame.

Turning to FIG. 6, therein is shown the present invention 10 wherein it is being used to install a screen 36 within the groove 66 of a window screen frame 68 using spline 70 wherein the spline is round in shape. The present invention 10 is used in the same manner as previously disclosed with respect to FIG. 1, however, with respect to FIG. 6 the illustrated workpiece is a conventional window screen frame 68 as would be useful for screening the windows of a residential home or commercial building. The window screen frame member 68 has a groove 66 on an interior edge toward the center of the screen where the screen 36 is shown wherein the screen 36 is placed into the groove and held in place by the spline 70 which is generally a round spline as shown in FIG. 6. In a typical installation process, the frame member 68 would be laying on a flat surface with the opening of the groove 66 facing toward the upper side. Also, FIG. 6 shows the window screen member 68 along with the groove 66 showing the screen 36 being installed in the groove with a spline 70 being then placed over the screen in the groove so as to hold the screen in the groove 66 in a very tight and secure manner similar to that shown in FIG. 5. One skilled in the art would understand that spline 70 is sized and shaped to be frictionally held within the groove 66 in the conventional manner so that the screen 36 is tightly held within the groove 66. The spline 70 shown in FIG. 6 is round shaped versus the spline 38 shown in FIG. 5 which is oval shaped. Previously disclosed elements may also be shown.

By reference to FIG. 1-6, the operation of the present invention 10 may be described as a means for securely fixing a screen 36 on a frame member 32, 68 of a screened-in porch, door or window screen including: a) placing a portion of the screen over a groove 34, 66 in the frame member; b) using a spline 38, 70 to press the screen portion into the groove; c) securely fixing the screen in the groove by pushing a roller 16 of an electrically powered screen installing hand tool 10 along the spline in the groove while the roller is being reciprocated by the hand tool along a longitudinal axis of the hand tool; and, d) whereby the reciprocating motion of the rotatable wheel along the longitudinal axis of the hand tool while the wheel is being moved along the spline in the groove causes the screen to be tightly and securely held within the groove.

As used in this specification, the term transmission 43 is defined as the assembly of parts by which power/energy is transmitted from the electric motor 44 to the roller 16. Also, lines with arrowheads are sometimes placed on drawings to indicate motion or direction of movement of an item illustrated in the drawing.

We claim:

1. A method of securely fixing a screen on a frame member, comprising the steps of:
   a) placing a portion of the screen over a groove in the frame member;
   b) using a spline to press the screen portion into the groove;
   c) grasping an elongated handle with one hand, said handle containing an electric motor at an upper end thereof, an output shaft of said motor extending into a vibrator which converts rotation of said output shaft to vibration and by direct connection through a drive shaft to a roller causing the roller to vibrate along a longitudinal axis of said elongated handle, said roller mounted on a distal end of said drive shaft extending out of a lower end of said handle, and said electric motor, output shaft, vibrator, drive shaft and roller all aligned, the electric motor, output shaft and vibrator within said handle;
   d) securely fixing the screen in the groove by pushing said roller along the spline in the groove while the roller is being reciprocated by the hand tool; and
   e) whereby the reciprocating motion of the roller along the longitudinal axis of the hand tool while the wheel is being moved along the spline in the groove causes the screen to be tightly and securely held within the groove.

2. The method of claim 1, in which the frame member is an upright member of a screened-in porch.

3. The method of claim 1, in which the frame member is part of a window screen.

4. The method of claim 1, in which a power cord extends out from said upper end of said handle.

5. The method of claim 4, in which the roller is freewheeling.

6. The method of claim 5, in which the roller is carried on a forked member.

7. The method of claim 2, in which the vibrator comprises a first beveled gear engaging a second beveled gear having a pin offset from a center of rotation of the second beveled gear, the offset pin attached to one end of a rod, a second end of the rod engaging a proximate end of the drive shaft, whereby rotation of the offset pin causes the rod to convert rotating motion of the second beveled gear to reciprocal motion of the drive shaft.

8. The method of claim 7, in which the electric motor is powered by alternating current from said power cord from the housing.

9. The method of claim 7, in which the electric motor is powered by direct current.

10. The method of claim 7, in which the handle is ergonomically shaped.

* * * * *